W. A. WHALEN.
BREAD PAN CLIP.
APPLICATION FILED SEPT. 7, 1917.

1,285,858.

Patented Nov. 26, 1918.

WITNESSES

INVENTOR
W. A. Whalen,
BY Victor J. Evans
ATTORNEY

UNITED STATES PATENT OFFICE.

WILLIAM A. WHALEN, OF PHILADELPHIA, PENNSYLVANIA.

BREAD-PAN CLIP.

1,285,858.

Specification of Letters Patent.     Patented Nov. 26, 1918.

Application filed September 7, 1917.   Serial No. 190,214.

*To all whom it may concern:*

Be it known that I, WILLIAM A. WHALEN, a citizen of the United States, residing at 5329 Girard avenue, Philadelphia, in the county of Philadelphia and State of Pennsylvania, have invented new and and useful Improvements in Bread-Pan Clips, of which the following is a specification.

The invention relates to apparatus and utensils employed in the manufacture of bread, cake or the like, and more particularly to the pans for holding the plastic material resulting in bread or pastry after baking, and has for an object to provide a clip for holding the adjacent portions of batteries of pans in spaced relation, and preventing bending or disassociation thereof.

Among other features the invention comprehends the provision of a locking clip element for absolutely locking adjacent pans together, especially between their ends, that is to say, in such a manner that regardless of the use and abuse that the pans receive in being thrown around and piled up in quantities prior to being actively employed in baking, the side edges of said pans will not be bent, or the edges of adjacent pans become disassociated.

I am well aware that devices have been used heretofore holding the edges of adjacent pans, but devices of this character have not been held in a locking engagement with the pans, but merely clipped thereto, allowing removal of the clip element, if the adjacent edges are spread apart, and which may occur very easily. Furthermore, devices used heretofore do not lie flush with the upper edges of the pans, therefore, it is a hard matter to pile batteries of pans one upon the other, so that one will rest evenly upon the other. With my device the securing or locking element does not lie above the horizontal planes of the upper edges of the pans; therefore the pans or batteries of pans can easily be placed one upon the other in a super-posed relation. Still further known devices project over the edges of the pans and this is found in practice to be an undesirable feature, in that the dough, yeast, or other matter employed in the baking or the formation of the dough, lodges in the projecting ledges or interstices, thus preventing the pan from being easily cleaned, and therefore resulting in an unsanitary condition.

In the further disclosure of the invention, reference is to be had to the accompanying drawings, constituting a part of this specification, and in which similar characters of reference denote corresponding parts in all the views, and in which—

Figure 1:
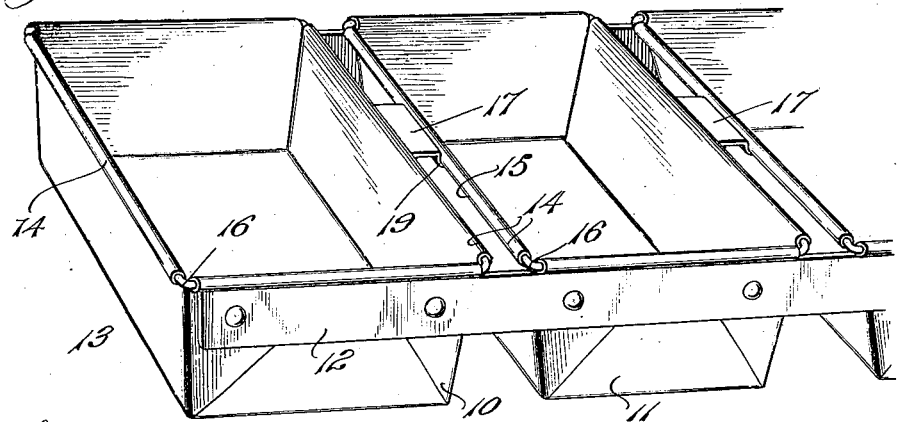
Figure 1 is a fragmentary perspective view of a battery of pans, showing my device applied.
Figure 2:
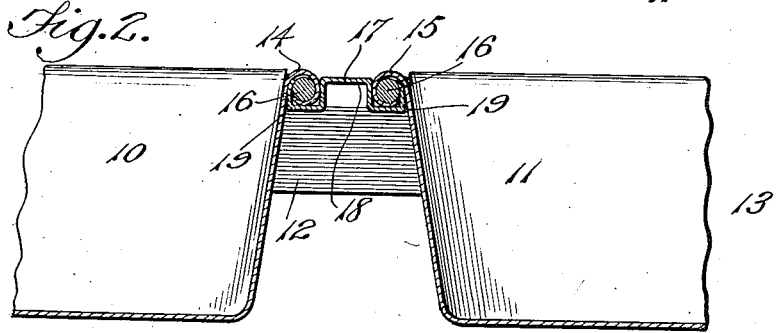
Fig. 2 is a vertical sectional view taken through a portion of the structure shown in Fig. 1, disclosing the precise arrangement of my invention.
Figure 3:
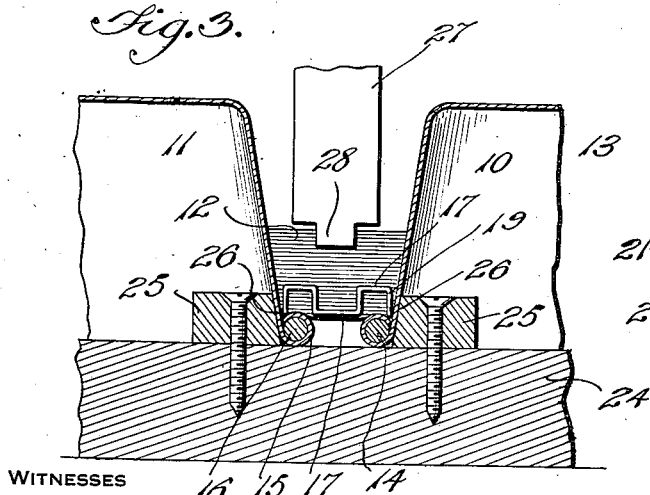
Fig. 3 is substantially a view of the pans shown in Fig. 2, disclosing them in an inverted position, and arranged to receive the locking clip.

Referring more particularly to the views, the pans 10 and 11 shown in Figs. 1, 2 and 3, are secured together by the usual longitudinal strip 12, and when secured are designated as a battery 13. It will be seen that each pan has longitudinal edges or ribbed portions 14, which are each formed by having an end 15 of the material of the pan arranged to pass around a bar or reinforcing wire 16, this being accomplished in the making of the pan.

Figure 4:
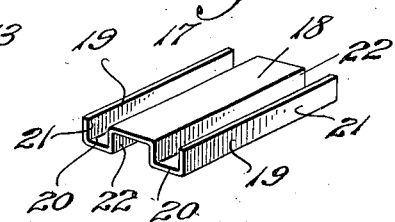
Fig. 4 is a perspective view of the locking clip.

My locking clip as shown in Fig. 4 is indicated by the numeral 17, said locking clip consisting substantially of a single piece of flat metal, comprising a central flat portion 18, and adjacently formed parallel channel portions 19, having their bottoms or plane surfaces 20 parallel to the top central plane portion 18, and their sides 21 parallel to the sides 22 of the central portion 18.

Referring to Fig. 3 it will be seen that the pans 10 and 11 are inverted upon a base 24, having suitable blocks 25 with beveled faces 26, with the adjacent edges or sides 14 of the pans received between the blocks 25. The clip element 17 is now inverted and placed down upon the edge portions of the pans, and a punching element 27, having a peculiarly shaped head 28, pressed down to engage with the clip element to force same into absolute engagement with the adjacent ribbed portions of adjacent pans, causing the sides 21 to pass between the side of the pan and the bar 16 on each pan, and also between the side of the pan and the edge of that side, as will be seen by referring to Fig. 3 and also to Fig. 2. Now when the battery of pans is inverted as shown in Fig.

2, it will be seen that the clip is securely locked, with the sides of the clip absolutely wedged between the bar 16 and the side of each pan, and that the central portion 18 of the clip will not project above the edges of the pans.

With this construction, it will be apparent that the clipping element when arranged as mentioned, is absolutely locked and cannot be removed, either accidentally or otherwise, and that it forms a permanent part of a battery of pans, serving to hold their adjacent sides against bending or relative disassociation, and thus preventing the sides of the pans from moving toward or away from each other, so that they will always be held in the same spaced relation, further, allowing one battery of pans to be placed on top of another, without interference from the clip element; whereas, the clip element by its particular arrangement with respect to the pans, will not provide any ledges adjacent the sides of the pans for the lodgment of material used in baking.

It is well known that heat will expand metal, and cold contract the same, and it will be clear that if a clip were arranged to connect the adjacent sides of pans merely by a spring action or by snapping the clip into engagement therewith, the successive expansion and contraction of the metal will tend to loosen the clip relatively to the sides of the pans. With my device this is impossible, in view of the fact that an absolutely locked connection is secured, and the clip element becomes practically a unitary part of the adjacently arranged pans.

It should be particularly noted that with my form of construction, there is absolutely no obstruction placed in the way of the usual greasing brushes or implements employed to grease the pans prior to placing the dough or other substance therein. With this in mind, it should be remembered that if my clip in any manner extended over an edge of the pan in such a way as to form a groove or recess of any character adjacent the interior of the pan and communicating therewith, the greasing brush when applied to grease the pan, would not reach the recess, and thus the dough, when the same rises in the pan due to the heat, would clog and stick in the recess, thus not only crippling the loaf but also resulting in an unsanitary condition, for the reason that when the bread is subsequently removed from the pan, there would still remain a quantity of dough in the recess, and due to the yeast, this might tend to ferment or otherwise become bad, so that a subsequent loaf of bread baked in the pan would not be clean and pure.

With my construction, however, this is all avoided, as the clip does not extend to any position adjacent the interior of the pan where there would be formed a recess capable of receiving a quantity of the dough, and further, no recess would be formed which would not be accessible by the greasing brush or other implement employed to grease the pan prior to placing the dough therein.

Having described my invention, I claim:

In combination with a plurality of rectangular pans each having its upper edges provided with reinforcing wires, the edges of the pan being bent outwardly and substantially encircling said wires to form beads; a clip disposed between adjacent pans and comprising a body formed of sheet metal bent to provide spaced longitudinally extending channels receiving the beads of the adjacent edges of the pans, the outer longitudinal sides of the clip being disposed between the beads and the sides of the pan and the outer longitudinal edges of the clips being pressed into partially encircling relation to the wires within the beads.

In testimony whereof I affix my signature.

WILLIAM A. WHALEN.